C. M. HOGHTON.
Check-Rower.

No. 197,633.   Patented Nov. 27, 1877.

Witnesses:   Inventor:

UNITED STATES PATENT OFFICE.

CHARLES M. HOGHTON, OF DELAVAN, ILLINOIS.

IMPROVEMENT IN CHECK-ROWERS.

Specification forming part of Letters Patent No. 197,633, dated November 27, 1877; application filed May 18, 1876.

*To all whom it may concern:*

Be it known that I, CHARLES M. HOGHTON, of Delavan, in the county of Tazewell and State of Illinois, have invented certain new and useful Improvements in Check-Rowers; and I do hereby declare that the following is a full, clear, and exact description of the construction and operation of the same, reference being had to the accompanying drawing, making a part of this specification, in which—

Figure 1:
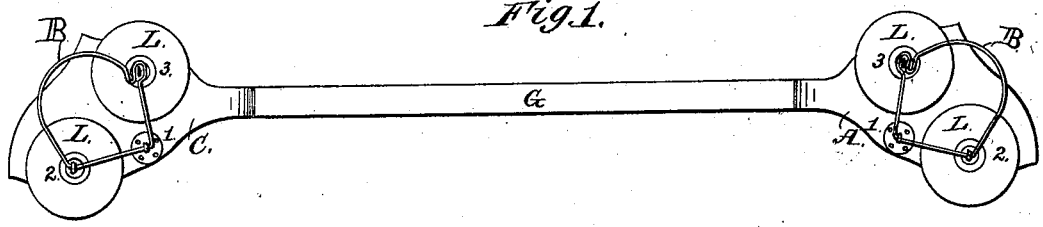
Figure 2:
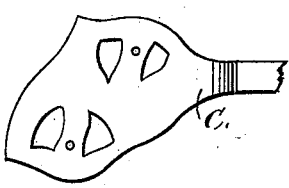
Figure 3:
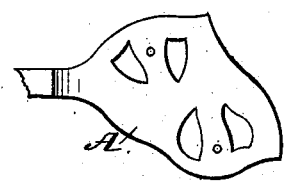
Figure 4:
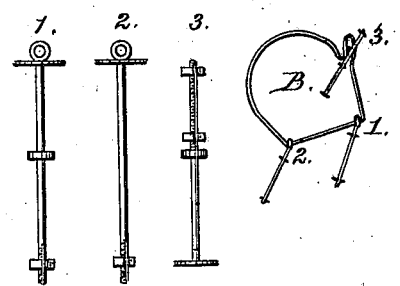
Figure 5:
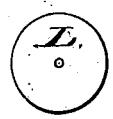

Figure 1 is a plan view of my improved check-rower; Fig. 2, a top view of left pulley-holder; Fig. 3, a top view of right pulley-holder; Fig. 4, views, in detail, of bolts and hinged guard; and Fig. 5, a view of pulley.

Like letters in all the figures of the drawing indicate like parts.

This invention consists in the combination of a hinged guard or cord-holder, with pulleys attached to a frame, so as to prevent the cord from coming off the pulley or pulleys in the event of its working loose, and also permit the rope to shift itself when pulled to set the pin, as will be hereinafter more fully explained.

A and C are the right and left holders, connected by the bar G. L L L L are the pulleys, attached to the holders by rods 2 and 3 passing through the pulleys and holders, and secured in any suitable manner; B, the guard, consisting of wire passed through an eye of bolt 1 attached to the holder, and then bent around at right angles, and made to form a loop over the head of bolt 3, whence it is curved around and passed through an eye of bolt 2 and welded onto the opposite end of the same wire, the connection of the wire with the eyes of bolts 1 and 2 forming the hinge, by which the wire is held in place, and which will at the same time permit it to be raised up, so that the cord can be placed on or taken off the pulleys, as may be required. The loop of the guard secures it to the head of bolt 3, as stated above.

The object of the invention is to avoid the necessity of going around the planter each time the machine is turned at the end of the row to change the cord to the opposite side of the pulleys, whereas, by the arrangement of the pulleys, the rope will shift itself when pulled to set the pin, and it will be prevented from coming off by the guard.

Having thus fully described my invention, I claim therein as new and desire to secure by Letters Patent—

1. The combination of the hinged guard or cord-retainer B, pulleys L L, and holders A and C, substantially as and for the purpose set forth.

2. The bolts 1 and 2, provided with eyes, and attached to holders A and C, in combination with hinged guard B, constructed substantially as described.

CHAS. M. HOGHTON.

Witnesses:
L. D. LAWTON,
R. HOGHTON.